(12) United States Patent
Green

(10) Patent No.: US 10,328,867 B2
(45) Date of Patent: Jun. 25, 2019

(54) SWIVEL TAILGATE BRACKET

(71) Applicant: Panasonic Automotive Systems Company of America, Division of Panasonic Corporation of North America, Peachtree City, GA (US)

(72) Inventor: Alex Robert Green, Ann Arbor, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/710,562

(22) Filed: Sep. 20, 2017

(65) Prior Publication Data

US 2018/0086283 A1    Mar. 29, 2018

Related U.S. Application Data

(60) Provisional application No. 62/399,701, filed on Sep. 26, 2016.

(51) Int. Cl.
*B60R 11/04* (2006.01)
*B62D 33/027* (2006.01)
*B60R 1/00* (2006.01)
*B60R 11/00* (2006.01)

(52) U.S. Cl.
CPC ............... *B60R 11/04* (2013.01); *B60R 1/00* (2013.01); *B62D 33/0273* (2013.01); *B60R 2011/004* (2013.01); *B60R 2011/0085* (2013.01); *B60R 2011/0092* (2013.01); *B60R 2300/10* (2013.01); *B60R 2300/8046* (2013.01)

(58) Field of Classification Search
USPC ........................................ 396/428; 348/148
See application file for complete search history.

(56) References Cited

U.S. PATENT DOCUMENTS

| | | | | |
|---|---|---|---|---|
| 8,830,317 | B2* | 9/2014 | Meier | B60Q 1/00 348/143 |
| 2009/0297041 | A1* | 12/2009 | Nagamine | G06K 9/00805 382/209 |
| 2015/0085122 | A1* | 3/2015 | Van den Brink | B60R 1/00 348/148 |
| 2015/0183380 | A1* | 7/2015 | Da Deppo | H04N 7/183 348/148 |

* cited by examiner

*Primary Examiner* — Clayton E. LaBalle
*Assistant Examiner* — Warren K Fenwick
(74) *Attorney, Agent, or Firm* — Laurence S. Roach, Esq.

(57) ABSTRACT

A motor vehicle includes a horizontally oriented bed. A tailgate is pivotably attached to the bed. The tailgate is pivotable between an upright position and a horizontal position. A camera is pivotably attached to the tailgate. The camera has a field of view. An orientation sensor detects an orientation of the tailgate and/or the camera. An actuator pivots the camera relative to the tailgate. An electronic processor is communicatively coupled to the orientation sensor and to the actuator. The electronic processor receives a sensor signal from the orientation sensor. The electronic processor causes the actuator to pivot the camera dependent upon the sensor signal such that a field of view of the camera remains in a horizontal orientation throughout pivoting of the tailgate.

18 Claims, 4 Drawing Sheets

SWIVEL TAILGATE BRACKET

CROSS-REFERENCE TO RELATED APPLICATION

This application claims benefit of U.S. Provisional Application No. 62/399,701 filed on Sep. 26, 2016, which the disclosure of which is hereby incorporated by reference in its entirety for all purposes.

BACKGROUND OF THE INVENTION

1. Field of the Invention

The present invention relates to mounting a rear-facing camera on a truck tailgate.

2. Description of the Related Art

All production trucks use a fixed position bracket to mount a rear-facing camera on the truck's tailgate, as shown in FIG. 1.

SUMMARY OF THE INVENTION

The invention may provide a truck tailgate camera bracket with a rotating camera head. When the truck tail gate is lowered, the camera head may rotate outward toward the rear of the vehicle, enabling the camera head to be used when the truck is hauling large objects.

The invention is related to rear camera mounting on trucks. The mounting position is located on the tailgate, which could cause a problem if the driver is hauling an oversized load (e.g., long wood, etc.), and when the tailgate is lowered the camera is facing toward the front of the vehicle such that the camera is no longer capable of capturing images to the rear of the truck. The present invention may enable the camera to be used when the tailgate is lowered.

The invention comprises, in one form thereof, a motor vehicle including a horizontally oriented bed. A tailgate is pivotably attached to the bed. The tailgate is pivotable between an upright position and a horizontal position. A camera is pivotably attached to the tailgate. The camera has a field of view. An orientation sensor detects an orientation of the tailgate and/or the camera. An actuator pivots the camera relative to the tailgate. An electronic processor is communicatively coupled to the orientation sensor and to the actuator. The electronic processor receives a sensor signal from the orientation sensor. The electronic processor causes the actuator to pivot the camera dependent upon the sensor signal such that the field of view of the camera remains in a horizontal orientation throughout pivoting of the tailgate.

The invention comprises, in another form thereof, a method of operating a motor vehicle, including providing a horizontally oriented bed. A tailgate is pivotably attached to the bed. A camera is pivotably attached to the tailgate. The camera has a field of view. The tailgate is pivoted between an upright position and a horizontal position. An orientation of at least one of the tailgate and the camera is detected after the pivoting of the tailgate has commenced. The camera is pivoted relative to the tailgate dependent upon the detecting of the orientation such that a field of view of the camera remains in a horizontal orientation throughout pivoting of the tailgate.

The invention comprises, in yet another form thereof, a motor vehicle including a camera pivotably attached to a portion of a rear end of the motor vehicle. The camera has a field of view. An orientation sensor detects an orientation of the portion of the rear end of the motor vehicle anti/or the camera. An actuator pivots the camera relative to the portion of the rear end of the motor vehicle. An electronic processor is communicatively coupled to the orientation sensor and to the actuator. The electronic processor receives a sensor signal from the orientation sensor, and causes the actuator to pivot the camera dependent upon the sensor signal such that the field of view of the camera remains in a substantially horizontal, substantially rearward orientation during operation of the motor vehicle.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
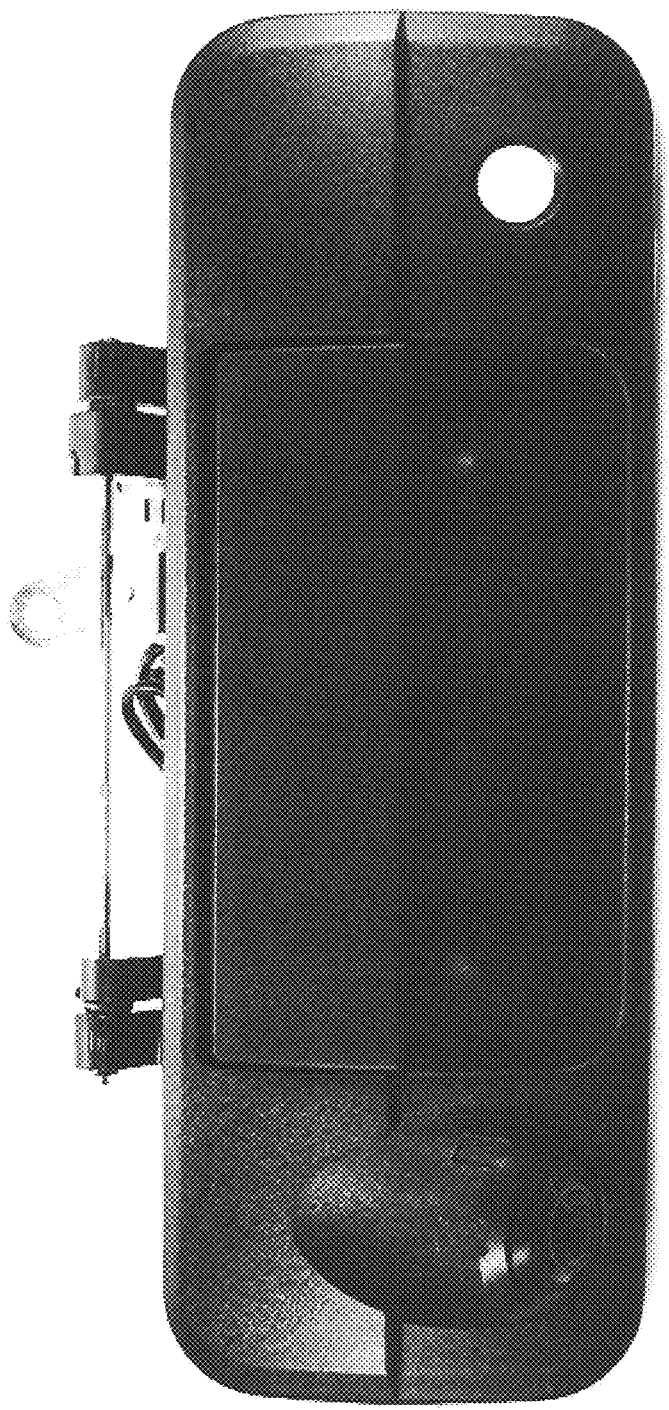
FIG. 1 is a block diagram of one embodiment of a truck tailgate with rear-facing camera of the prior art.
Figure 2A:
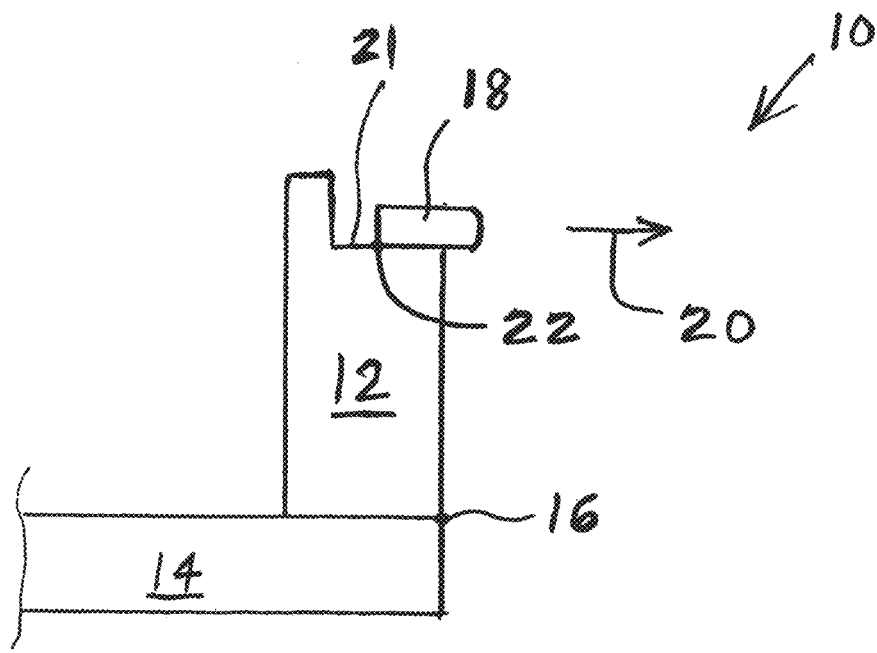
FIG. 2A is a fragmentary, side cross-sectional view of one embodiment of a truck tailgate with rear-geeing camera arrangement of the present invention with the tailgate in a closed or vertical position.

FIG. 2A is a fragmentary, side cross-sectional view of one embodiment of a truck tailgate with rear-facing camera arrangement 10 of the present invention with a tailgate 12 in a closed or vertical position. Tailgate 12 is pivotably attached to a truck bed 14, and may pivot relative to bed 14 about a pivot point 16. A rearward-facing camera 18 has a field of view approximately centered in a rearward direction indicated by arrow 20. Camera 18 is pivotably attached to a distal edge 21 of tailgate 12, and may pivot relative to tailgate 12 about a pivot point 22.

Figure 3:
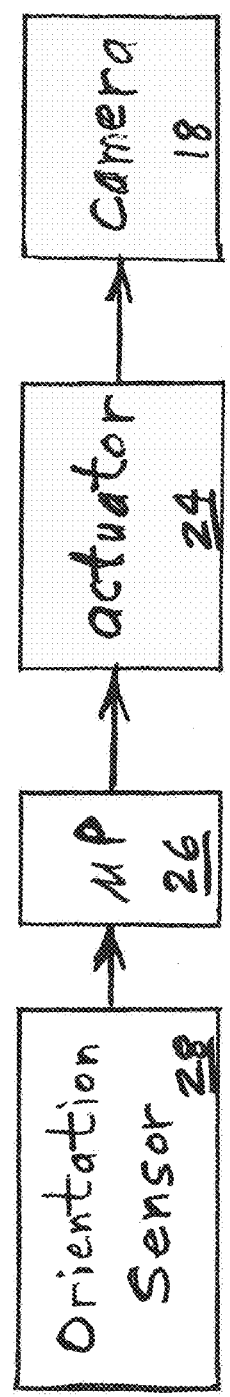
FIG. 3 is a block diagram of the camera of FIG. 2 and associated electronics.

FIG. 3 illustrates camera 18 and associated electronics for maintaining the field of view of camera 18 in horizontal direction 20 regardless of the orientation of tailgate 12. Camera 18 is pivoted by an actuator 24, which, in turn, is controlled by an electronic processor 26, A camera orientation sensor 28, which may be a geomagnetic field sensor, accelerometer and/or gyroscope, for example, determines the orientation of camera 18 and hence the orientation of the field of view of camera 18. Processor 26 may use the feedback signal from orientation sensor 28 to keep camera 18 pointed in a horizontal direction.

Figure 2B:
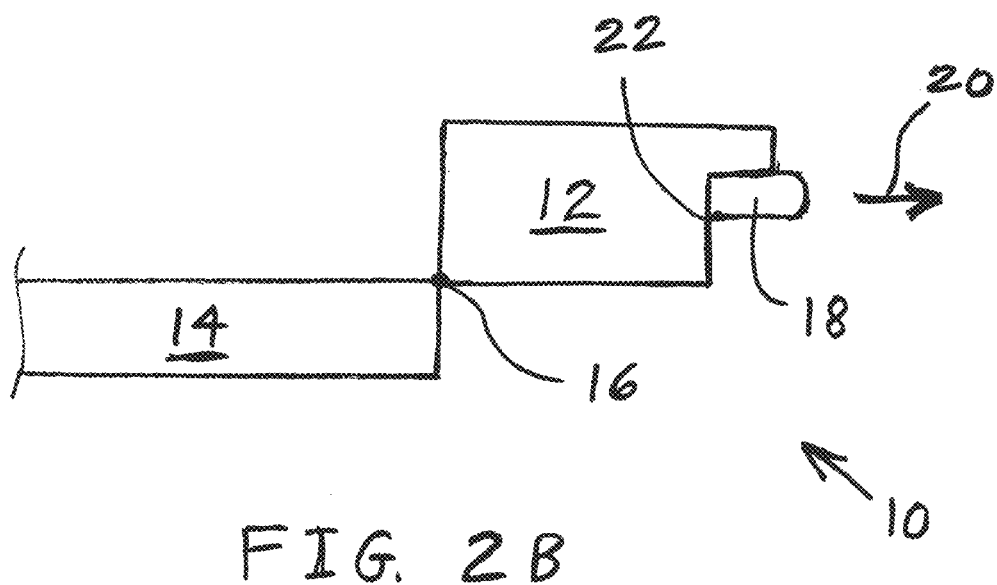
FIG. 2B is a fragmentary, side cross-sectional view of the track tailgate with rear-facing camera arrangement of the present invention of FIG. 2A with the tailgate in an open or horizontal position.

During use, tailgate 12 may be lowered to an open or horizontal orientation, as shown in FIG. 2B. As tailgate 12 pivots about pivot point 16, orientation sensor 28 senses the changing orientation of camera 18 and informs processor 26 of the changing orientation. Processor 26 responds by causing actuator 24 to pivot camera 18 about pivot point 22 to thereby maintain the field of view of camera 18 being centered in horizontal direction 20.

Figure 4:
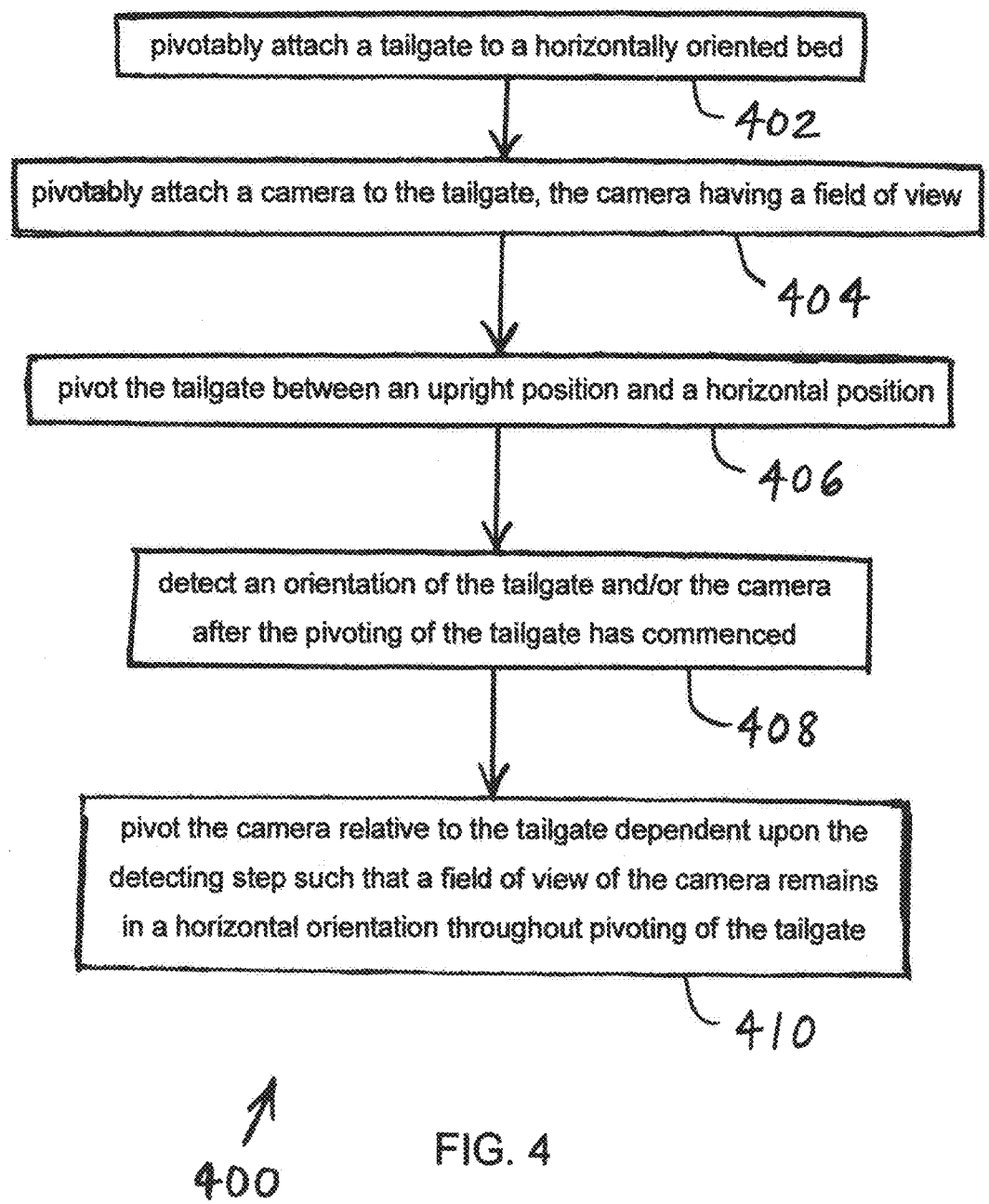
FIG. 4 is a flow chart of one embodiment of a method of the present invention for operating a motor vehicle.

FIG. 4 is a flow chart of one embodiment of a method 400 of the present invention for operating a motor vehicle. In a first step 402, a tailgate is pivotably attached to a horizontally oriented bed. For example, tailgate 12 is pivotably attached to a horizontally oriented truck bed 14

Next, in step 404, a camera is pivotably attached to the tailgate. The camera has a field of view. For example, camera 18 has a field of view approximately centered in a rearward direction indicated by arrow 20. Camera 18 is pivotably attached to a distal edge 21 of tailgate 12.

In a next step 406, the tailgate is pivoted between an upright position and a horizontal position. For example, tailgate 12 is pivoted between the upright position shown in FIG. 2A and the horizontal position shown in FIG. 2B.

In step 408, an orientation of the tailgate and/or the camera is detected after the pivoting of the tailgate has commenced. For example, as tailgate 12 pivots about pivot point 16, orientation sensor 28 senses the changing orientation of camera 18

In a final step 410, the camera is pivoted relative to the tailgate dependent upon the detecting step such that a field of view of the camera remains in a horizontal orientation throughout pivoting of the tailgate. For example, orientation sensor 28 informs processor 26 of the changing orientation. Processor 26 responds by causing actuator 24 to pivot camera 18 about pivot point 22 to thereby maintain the field of view of camera 18 being centered in horizontal direction 20.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor vehicle, comprising
    a horizontally oriented bed;
    a tailgate pivotably attached to the bed, the tailgate being pivotable between an upright position and a horizontal position;
    a camera pivotably attached to the tailgate, the camera having a field of view;
    an orientation sensor configured to detect an orientation of at least one of the tailgate and the camera, the orientation sensor comprising one of an accelerometer and a gyroscope;
    an actuator configured to pivot the camera relative to the tailgate; and
    an electronic processor communicatively coupled to the orientation sensor and to the actuator, the electronic processor being configured to:
        receive a sensor signal from the orientation sensor; and
        cause the actuator to pivot the camera dependent upon the sensor signal such that the field of view of the camera remains in a horizontal orientation throughout pivoting of the tailgate.

2. The motor vehicle of claim 1, wherein the camera is attached to a distal edge of the tailgate.

3. The motor vehicle of claim 1, wherein the orientation sensor comprises an accelerometer.

4. The motor vehicle of claim 1, wherein the orientation sensor comprises a gyroscope.

5. The motor vehicle of claim 1, wherein the electronic processor is configured to cause the actuator to pivot the camera dependent upon the sensor signal such that the field of view of the camera remains in a rearward, horizontal orientation throughout pivoting of the tailgate.

6. The motor vehicle of claim 1, wherein the orientation sensor is configured to detect an orientation of the camera.

7. A method of operating a motor vehicle, the method comprising:
    providing a horizontally oriented bed;
    pivotably attaching a tailgate to the bed;
    pivotably attaching a camera to the tailgate, the camera having a field of view;
    pivoting the tailgate between an upright position and a horizontal position;
    detecting an orientation of at least one of the tailgate and the camera after the pivoting of the tailgate has commenced, wherein the orientation is detected by one of an accelerometer and a gyroscope; and
    pivoting the camera relative to the tailgate dependent upon the detecting step such that a field of view of the camera remains in a horizontal orientation throughout pivoting of the tailgate.

8. The method of claim 7, wherein the camera is attached to a distal edge of the tailgate.

9. The method of claim 7, wherein the orientation is detected by an accelerometer.

10. The method of claim 7, wherein the orientation is detected by a gyroscope.

11. The method of claim 7, wherein the pivoting comprises pivoting the camera dependent upon the detecting step such that the field of view of the camera remains in a rearward, horizontal orientation throughout pivoting of the tailgate.

12. The method of claim 7, wherein the detecting step includes detecting an orientation of the camera.

13. A motor vehicle, comprising:
    a camera pivotably attached to a portion of a rear end of the motor vehicle, the camera having a field of view;
    an orientation sensor configured to detect an orientation of at least one of the portion of the rear end of the motor vehicle and the camera, wherein the orientation sensor comprises one of an accelerometer and a gyroscope;
    an actuator configured to pivot the camera relative to the portion of the rear end of the motor vehicle; and
    an electronic processor communicatively coupled to the orientation sensor and to the actuator, the electronic processor being configured to:
        receive a sensor signal from the orientation sensor; and
        cause the actuator to pivot the camera dependent upon the sensor signal such that the field of view of the camera remains in a substantially horizontal, substantially rearward orientation during operation of the motor vehicle.

14. The motor vehicle of claim 13, wherein the portion of the rear end of the motor vehicle includes a proximal end and a distal end, the camera being attached to the distal end.

15. The motor vehicle of claim 13, wherein the orientation sensor comprises an accelerometer.

16. The motor vehicle of claim 13, wherein the orientation sensor comprises a gyroscope.

17. The motor vehicle of claim 13, wherein the electronic processor is configured to cause the actuator to pivot the camera dependent upon the sensor signal such that the field of view of the camera remains in a rearward, horizontal orientation throughout pivoting of the portion of the rear end of the motor vehicle.

18. The motor vehicle of claim 13, wherein the orientation sensor is configured to detect an orientation of the camera.

* * * * *